United States Patent
Bhatt et al.

(10) Patent No.: US 8,000,838 B2
(45) Date of Patent: *Aug. 16, 2011

(54) SYSTEMS AND METHODS THAT FACILITATE MOTION CONTROL THROUGH COORDINATE SYSTEM TRANSFORMATIONS

(75) Inventors: Jatin P. Bhatt, Richmond Heights, OH (US); Fabio Malaspina, Twinsburg, OH (US); Michael Piatka, Mentor, OH (US); William C. Schwarz, Shaker, OH (US); Jeffrey W. Brooks, Mentor on the Lake, OH (US); Slobodan Milosevic, Schaumburg, IL (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 46 days.

This patent is subject to a terminal disclaimer.

(21) Appl. No.: 11/848,926

(22) Filed: Aug. 31, 2007

(65) Prior Publication Data

US 2008/0051938 A1    Feb. 28, 2008

Related U.S. Application Data

(63) Continuation of application No. 10/955,068, filed on Sep. 30, 2004, now Pat. No. 7,266,425.

(51) Int. Cl.
*G05B 19/19* (2006.01)
*G05B 19/04* (2006.01)

(52) U.S. Cl. ............ 700/251; 700/262; 606/130; 606/9; 901/1; 901/9; 318/568.19

(58) Field of Classification Search ............ 700/251
See application file for complete search history.

(56) References Cited

U.S. PATENT DOCUMENTS

| 3,986,007 A | 10/1976 | Ruoff, Jr. |
| 4,517,652 A | 5/1985 | Bennett et al. |

(Continued)

FOREIGN PATENT DOCUMENTS

EP    0 181 406 A    5/1986

(Continued)

OTHER PUBLICATIONS

T. Cord. "Maschinen aus dem Baukasten" A&D, vol. 05, No. 4, Apr. 30, 2005, pp. 48-51, XP002465217. Munchen, Germany. ISSN: 1618-2898 http://backoffice.el au.de/fi les/2424-99154299%5C48-51-A-D-FB-E1 au-NEU . pdf >. Last accessed Jan. 18, 2007.

(Continued)

*Primary Examiner* — Thomas G Black
*Assistant Examiner* — Lin B Olson
(74) *Attorney, Agent, or Firm* — Turocy & Watson LLP; R. Scott Speroff; John M. Miller

(57) ABSTRACT

The subject invention relates to systems and methods that facilitate motion between different coordinate systems in an industrial control environment. The systems and methods accept data in one coordinate system and transform the data to a different coordinate system. Suitable transformations include instructions that transform between Cartesian, pre-defined non-Cartesian, and user-defined non-Cartesian coordinate systems, including transformations between a non-Cartesian coordinate system to another non-Cartesian coordinate system. Such transformations can be programmed in essentially any industrial control language and can be seamlessly integrated with the control environment. The systems and methods can be utilized to generate a motion instruction that includes, among other information, source and target coordinate systems and the transformation between them. The subject invention provides for connecting various systems together through respective motion instructions, wherein a motion of a source system is mapped to a coordinate system of a target system and the target system is moved accordingly.

20 Claims, 16 Drawing Sheets

U.S. PATENT DOCUMENTS

| | | | |
|---|---|---|---|
| 4,635,206 A | | 1/1987 | Bhatia et al. |
| 4,665,352 A | | 5/1987 | Bartelt et al. |
| 4,683,544 A | * | 7/1987 | Hariki .......................... 700/251 |
| 4,705,451 A | | 11/1987 | Mori et al. |
| 4,706,004 A | | 11/1987 | Komatsu et al. |
| 4,773,025 A | | 9/1988 | Penkar et al. |
| 4,774,445 A | | 9/1988 | Penkar |
| 4,823,279 A | | 4/1989 | Perzley et al. |
| 4,947,336 A | | 8/1990 | Froyd |
| 4,975,856 A | | 12/1990 | Vold et al. |
| 5,198,737 A | | 3/1993 | Harima et al. |
| 5,434,489 A | | 7/1995 | Cheng et al. |
| 5,453,933 A | | 9/1995 | Wright et al. |
| 5,481,712 A | * | 1/1996 | Silver et al. .................. 717/109 |
| 5,617,515 A | * | 4/1997 | MacLaren et al. ............ 700/264 |
| 5,758,298 A | | 5/1998 | Guldner |
| 5,867,385 A | | 2/1999 | Brown et al. |
| 5,920,483 A | | 7/1999 | Greenwood et al. |
| 5,949,685 A | | 9/1999 | Greenwood et al. |
| 6,442,442 B1 | | 8/2002 | Weinhofer |
| 6,456,897 B1 | | 9/2002 | Papiernik et al. |
| 6,615,112 B1 | | 9/2003 | Roos |
| 6,681,145 B1 | | 1/2004 | Greenwood et al. |
| 6,912,428 B2 | | 6/2005 | Nakai et al. |
| 6,980,881 B2 | | 12/2005 | Greenwood et al. |
| 7,266,425 B2 | | 9/2007 | Bhatt et al. |
| 7,313,264 B2 | * | 12/2007 | Crampton .................... 382/154 |
| 7,433,760 B2 | * | 10/2008 | Alvarez et al. ................ 700/251 |
| 7,693,325 B2 | * | 4/2010 | Pulla et al. ................... 382/154 |
| 2003/0120828 A1 | * | 6/2003 | Clark et al. ................... 709/319 |
| 2004/0024472 A1 | | 2/2004 | Evans et al. |
| 2005/0067995 A1 | * | 3/2005 | Weinhofer et al. ........... 318/574 |
| 2005/0071021 A1 | | 3/2005 | Weinhofer |
| 2006/0074527 A1 | | 4/2006 | Bhatt et al. |

FOREIGN PATENT DOCUMENTS

| | | | |
|---|---|---|---|
| EP | 0181406 A | * | 5/1986 |
| EP | 181406 A1 | * | 5/1986 |
| EP | 0 827 053 A | | 3/1998 |
| EP | 1 643 327 A3 | | 4/2006 |

OTHER PUBLICATIONS

S. Spada. "Integral Robotics Raises Agility and Flexibility of Packaging Machines" ARC Brief, ARC Advisory Group, Apr. 21, 2005, XP002465218, Online Article http ://www. packworl d. com/graphics/call/ARC-Robot i cs . pdf>. Last accessed Jan. 18, 2008.

European Search Report for European Patent Application No. EP05014206 dated Jan. 31, 2008, 2 pages.

OA mailed Sep. 30, 2008 for U.S. Appl. No. 11/838,472, 11 pages.

EP OA mailed Jul. 14, 2008 for EP Application Serial No. 05014206. 6-1239, 7 pages.

Office Action dated Dec. 15, 2009 for U.S. Appl. No. 10/838,472, 17 pages.

Office Action dated Sep. 7, 2007 for U.S. Appl. No. 10/838,472, 12 pages.

Office Action dated Feb. 7, 2007 for U.S. Appl. No. 10/955,068, 17 pages.

Office Action dated Sep. 8, 2006 for U.S. Appl. No. 10/955,068, 14 pages.

OA dated Jun. 17, 2010 for U.S. Appl. No. 10/838,472, 22 pages.

Final OA mailed Mar. 17, 2009 for U.S. Appl. No. 10/838,472, 12 pages.

\* cited by examiner

Articulated Independent

Vertical Articulated Independent

SYSTEMS AND METHODS THAT FACILITATE MOTION CONTROL THROUGH COORDINATE SYSTEM TRANSFORMATIONS

RELATED APPLICATIONS

This application is a continuation of U.S. patent application Ser. No. 10/955,068, filed Sep. 30, 2004 now U.S. Pat. No. 7,266,425, and entitled "SYSTEMS AND METHODS THAT FACILITATE MOTION CONTROL THROUGH COORDINATE SYSTEM TRANSFORMATIONS", which is related to co-pending U.S. patent application Ser. No. 10/838,472, filed on May 4, 2004, and entitled "SYSTEMS AND METHODS FOR INTEGRATED MULTI-AXIS COORDINATION" and to U.S. patent application Ser. No. 10/853,674, filed on May 25, 2004, issued on May 5, 2009, as U.S. Pat. No. 7,529,599 and entitled "SYSTEMS AND METHODS FOR COORDINATION MOTION INSTRUCTIONS," the entireties of which are incorporated herein by reference.

TECHNICAL FIELD

The subject invention relates to industrial control systems and, more particularly, to systems and methods that provide motion coordination between different coordinate systems through pre-defined and user-defined transforms written in industrial control languages.

BACKGROUND OF THE INVENTION

Industrial controllers are special purpose processing devices used for controlling (e.g., automated and semi-automated) industrial processes, machines, manufacturing equipment, plants, and the like. A typical controller executes a control program or routine in order to measure one or more process variables or inputs representative of the status of a controlled process and/or effectuate outputs associated with control of the process. The inputs and outputs can be digital and/or analog, assuming a continuous range of values. A typical control routine can be created in a controller configuration environment that has various tools and interfaces whereby a developer can construct and implement a control strategy using industrial and conventional programming languages or graphical representations of control functionality. Such control routine can be downloaded from the configuration system into one or more controllers for implementation of the control strategy in controlling a process or machine.

Measured inputs received from a controlled process and outputs transmitted to the process can pass through one or more input/output (I/O) modules in a control system. Such modules can serve in the capacity of an electrical interface between the controller and the controlled process and can be located local or remote from the controller. Inputs and outputs can be recorded in memory. The input values can be asynchronously or synchronously read from the controlled process by one or more input modules and output values can be written directly to memory by a processor for subsequent communication to the process by specialized communications circuitry. An output module can interface directly with a controlled process by providing an output from memory to an actuator such as a motor, drive, valve, solenoid, and the like.

During execution of the control routine, values of the inputs and outputs exchanged with the controlled process can pass through memory. The values of inputs in memory can be asynchronously or synchronously updated from the controlled process by dedicated and/or common scanning circuitry. Such scanning circuitry can communicate with input and/or output modules over a bus on a backplane or network. The scanning circuitry can also asynchronously or synchronously write values of the outputs in memory to the controlled process. The output values from the memory can be communicated to one or more output modules for interfacing with the process. Thus, a controller processor can simply access the memory rather than needing to communicate directly with the controlled process.

In distributed control systems, controller hardware configuration can be facilitated by separating the industrial controller into a number of control elements, each of which performs a different function. Particular control modules needed for the control task can then be connected together on a common backplane within a rack and/or through a network or other communications medium. The control modules can include processors, power supplies, network communication modules, and I/O modules exchanging input and output signals directly with the controlled process. Data can be exchanged between modules using a backplane communications bus, which can be serial or parallel, or via a network. In addition to performing I/O operations based solely on network communications, smart modules exist which can execute autonomous logical or other control programs or routines. Various control modules of a distributed industrial control system can be spatially distributed along a common communication link in several locations. Certain I/O modules can thus be located proximate to a portion of the control equipment, and away from the remainder of the controller. Data can be communicated with these remote modules over a common communication link, or network, wherein all modules on the network communicate via a communications protocol.

In a typical distributed control system, one or more I/O modules are provided for interfacing with a process. The outputs derive their control or output values in the form of a message from a master or peer device over a network or a backplane. For example, an output module can receive an output value from a processor via a communications network or a backplane communications bus. The desired output value is generally sent to the output module in a message. The output module receiving such a message will provide a corresponding output (analog or digital) to the controlled process. Input modules measure a value of a process variable and report the input values to another device over a network or backplane. The input values can be used by a processor for performing control computations.

Such control systems can be employed to control motion related to machines such as robots. Many of these systems include a source that commands motion in a target system. For example, control software (the source) can be utilized to move a machine (the target). In many instances, a first machine is a source that when moved invokes a corresponding move in a target machine. In this instance, the first machine can be moved by direct command or manually. In general, source and target systems operate within distinct coordinate systems. For example, control software may display and input motion related information in a Cartesian coordinate system, whereas a machine may move in a non-Cartesian (pre-defined or user-defined) coordinate system. In many of these systems, transforms are utilized to map a position in a source coordinate system to a position in a target coordinate system such that a movement (actual or a command) in the source system can be propagated to the target system. These transforms typically are provided by a vendor of the control system. However, conventional control systems either do not provide for user-defined transforms or such user-defined transforms are written in C, assembly, Pascal, Basic, and the like that are not easily integrated or user modified after being integrated within control software.

SUMMARY OF THE INVENTION

The following presents a simplified summary of the invention in order to provide a basic understanding of some aspects of the invention. This summary is not an extensive overview of the invention. It is intended neither to identify key or critical elements of the invention nor to delineate the scope of the invention. Its sole purpose is to present some concepts of the invention in a simplified form as a prelude to the more detailed description that is presented later.

The subject invention relates to systems and methods that provide for multi-axis (e.g., multi-dimensional) motion coordination between different coordinate systems in the industrial control environment. The subject invention provides a set of pre-defined (system) transformations and enables a user to program/add user-defined transformations. Both pre-defined and user-defined transformations can be programmed in essentially any language including industrial control languages. This capability provides for novel advantages over conventional systems, which typically include coordinate system transforms that are hard coded in C, Basic, assembly, Pascal, and the like. Allowing user-defined transformations to be programmed in industrial control languages provides for seamless integration and synchronization of user-defined transformations with a control system, and facilitates ease of user modifications.

In general, a user can specify (e.g., configure a geometry for) a source coordinate system and a target coordinate system by setting corresponding coordinate system type attributes of a coordinate system tag, wherein a suitable transformation can be specified to transform a position in the source coordinate system to a position in the target coordinate system, and vice versa. It is to be appreciated that suitable transformations include instructions that transform Cartesian coordinates to different Cartesian coordinates, Cartesian coordinates to non-Cartesian (pre-defined and user-defined) coordinates, non-Cartesian coordinates of one coordinate system (pre-defined and user-defined) to non-Cartesian coordinates of a different coordinate system (pre-defined and user-defined), and non-Cartesian coordinates (pre-defined and user-defined) to Cartesian coordinates.

Upon selecting the source and target coordinate systems, a motion instruction can be programmed that includes the source and target coordinate systems and a relationship (e.g., based on the transform) there between. This motion instruction can be employed to define a relationship between source and target systems. For example, when a motion is commanded in the source coordinate system, the position of the source coordinate system is transformed to the target coordinate system, and the target system is positioned accordingly. In another example, when a motion occurs in the target coordinate system, the position of the target coordinate system can be transformed to the source coordinate system to position the source system accordingly.

In general, motion associated with many "traditional" machines is achieved in Cartesian coordinates. These Cartesian machines are usually characterized by multiple linear axes set at right angles to each other. Due to their construction, Cartesian machines efficiently move in Cartesian coordinate space along Cartesian paths (like lines and circles) at "intuitive" speeds (such as inches/second). More often than not, however, they do not allow for programmable orientation of their "tools". Machines that mimic human motion or allow you to position and orient their "tools" are generally referred to as robots. Robots are usually characterized by multiple rotary axes (e.g., joints) connected by linear links or axes. Due to their construction, many robots move more easily in compound arcs at non-intuitive speeds (such as inch-degrees/second) and not along Cartesian paths. Like human arms, most robots possess great flexibility of motion. The subject invention provides a novel approach to control robot motion through a Cartesian (or other) coordinate system, wherein motion is transformed from the Cartesian coordinate system to a pre-defined or user-defined non-Cartesian coordinate system native to the robot. The transform utilized to achieve the foregoing can be user-generated, user-integrated and written in any industrial control language.

To the accomplishment of the foregoing and related ends, the invention, then, comprises the features hereinafter fully described. The following description and the annexed drawings set forth in detail certain illustrative aspects of the invention. However, these aspects are indicative of but a few of the various ways in which the principles of the invention can be employed. Other aspects, advantages and novel features of the invention will become apparent from the following detailed description of the invention when considered in conjunction with the drawings.

DETAILED DESCRIPTION OF THE INVENTION

Figure 1:
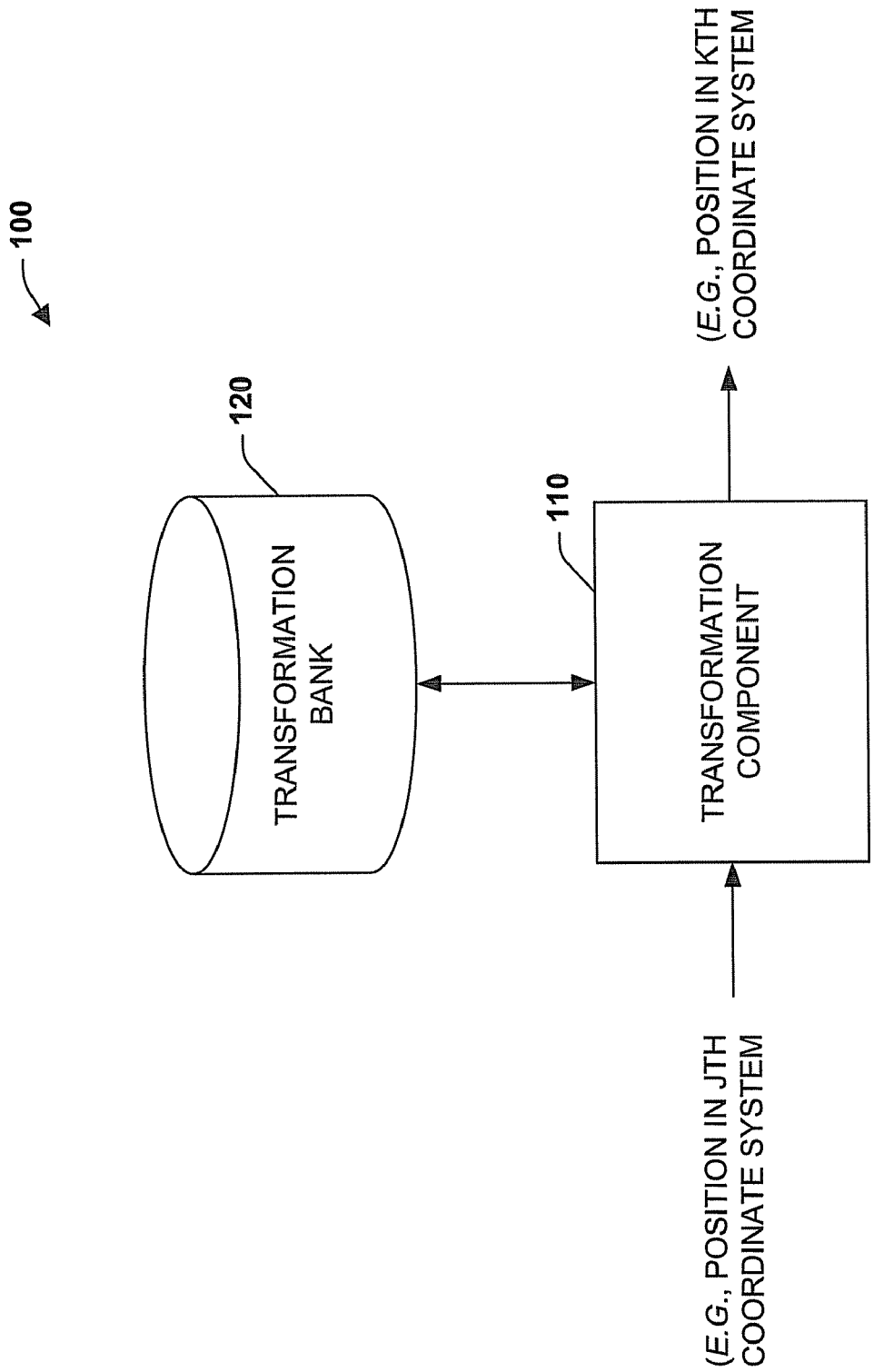
FIG. 1 illustrates a system that facilitates coordinate system transformations between systems in an industrial control environment.

As utilized in this application, terms "component," "system," "controller," "module," "device," "manager," and variants thereof are intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a server and the server can be a component. One or more components can reside within a process and/or thread of execution and a component can be localized on one computer and/or distributed between two or more computers.

As utilized herein, "transform," "transformation," and variants thereof generally refer to mapping (or converting) one or more coordinates in a coordinate system (e.g., related to a position in space) to one or more coordinates in another coordinate system. Examples of mappings that can be employed in accordance with the subject invention include, but are not limited to: transforming a position in a Cartesian coordinate system to a position in a different Cartesian coordinate system; a position in a Cartesian coordinate system to a position in a non-Cartesian coordinate system; transforming a position in a non-Cartesian coordinate system to a position in another non-Cartesian coordinate system; and transforming a position in a non-Cartesian coordinate system to a position in a Cartesian coordinate system. It is to be understood that a non-Cartesian coordinate system can be a "pre-defined" non-Cartesian coordinate system or a "user-defined" non-Cartesian coordinate system. A "pre-defined" non-Cartesian coordinate system typically refers to a coordinate system provided with the systems and methods described herein and can be considered a "system" non-Cartesian coordinate system. A "user-defined" coordinate system refers to a non-Cartesian coordinate system that a user of the systems and methods creates. A "user-defined" non-Cartesian coordinate system can be created through the subject invention, stored with "pre-defined" non-Cartesian coordinate systems, and utilized as if they were "pre-defined" non-Cartesian coordinate systems.

The subject invention relates to system and methods that facilitate motion coordination between coordinate systems through various coordinate system transformations, including user-defined transformations written in industrial control languages (e.g., IEC languages) for user-defined non-Cartesian coordinate systems. Conventionally, coordinate system transforms are hard coded in C, Basic, assembly, Pascal, and the like and thus are not easily integrated within a motion control system. The subject invention provides a novel technique that enables a user to program a non-Cartesian coordinate system and seamlessly integrate this user-defined coordinate system and associated transformation into the motion control system. Examples of suitable programming languages that can be employed in accordance with aspects of the subject invention include structured text (ST), sequential function chart (SFC), functional block diagram (FBD), instruction list (IL), and ladder diagram (LD). However, other languages such as C, C++, C#, Basic, assembly, Pascal, and the like can be utilized, if desired. It is to be appreciated that these languages can be invoked via a routine and an add-on instruction (e.g. through a JXR), for example.

The systems and methods utilize a coordinate transformation component that accepts data defined in a Cartesian coordinate system and transforms it to data in a different Cartesian coordinate system and/or a non-Cartesian coordinate system (e.g., pre-defined and user-defined). In addition, the system and methods can accept data in a non-Cartesian coordinate system (e.g., pre-defined and user-defined) and transform it to data in a different non-Cartesian coordinate system (e.g., pre-defined and user-defined) or a Cartesian coordinate system. The foregoing can be achieved through a coordinate system transformation, which can be created in essentially any language including industrial control languages. In general, a user can specify source and target coordinate systems (e.g., via setting coordinate system type attributes of a coordinate system tag), whereby a motion instruction can be generated that denotes the source and target coordinate systems and a transformation to map from the source to the target coordinate system. Then, when a motion is commanded in the source coordinate system, the position of the source coordinate system can be transformed to the target coordinate system, and the target system can be positioned accordingly.

FIG. 1 illustrates a system 100 that facilitates coordinate system transformations within industrial control environments. The system 100 includes a coordinate transformation component 110 and a transformation bank 120. The coordinate transformation component 110 can receive a position in a coordinate system and transform the position to a position in a different coordinate system via a transform from the transformation bank 120. The two coordinate systems can be essentially any coordinate systems, including Cartesian, pre-defined non-Cartesian, and/or user-defined non-Cartesian coordinate systems. As noted previously, the term transformation and variants thereof, as utilized herein, generally refers to converting a position/point between any two coordinate system geometries. For example, a point in Cartesian space defined by Pcart(X, Y, Z, J4, J5, J6) can be converted to a point in Joint space defined by Pjoint(J1, J2, J3, J4, J5, J6). In this example, X, Y and Z are Cartesian space coordinates, J1, J2 and J3 are corresponding Joint space coordinates, and J4, J5 and J6 are pitch, yaw, and roll, respectively.

The coordinate transformation component 110 can be utilized when controlling motion/movements, for example, in connection with a machine such as a robot (e.g., a robotic arm) or similar machine that automates tasks such as placing items, cutting objects, welding, gluing, etc. For example, a user utilizing industrial control software can input a next/new position for the machine. This input can be provided in a coordinate system selected by the user. However, actual movement of the machine may be achieved in a different coordinate system. In this example, the coordinate transformation component 110 can be utilized to convert the user provided position in one coordinate system to a position in the native coordinate system utilized by the machine which may be different. Once mapped, the machine can move to a new position based on its native coordinate system.

Although this example depicts a single transformation from user control software to machine movement, it can be appreciated that more than one coordinate system transformations may occur. For example, a first transformation can occur between a programming space and a positioning space, and a second transformation can occur between the positioning space and the joint space. In another example, a system may include a series of machines, wherein motion in any one of the machines invokes motion in the remaining machines. Respective machines may move based on different coordinate systems and, thus, a coordinate system transformation can be utilized to facilitate mapping a movement in one machine to a movement in one or more other machines. An example of a system that utilizes multiple transformations is provided in detail below in connection with FIG. 6.

In addition to commanded movement from the control software, the machine can be manually (e.g., via human interaction) moved or commanded to move through an alternative means such as instructions provided outside of the control software (e.g., via a serial port). When such movements occur, the coordinate transformation component 110 can be utilized to map actual machine movement in the machine's coordinate system to movement in the coordinate system utilized by the user at the control software. The transformation can be employed to update the control software with a current position of the machine. Thus, the user and the control software can be provided with a current position of the machine. Similar to position transformations from control software coordinate system space to machine coordinate system space, position transformations from machine coordinate system space to user coordinate system space may include intermediate transformations. For example, a first transformation can occur between a joint space and a positioning space and a second transformation can occur between the positioning space and a programming space. Typically, a different transformation is utilized depending on the direction of the conversion, for example, one transformation is utilized when transforming coordinate systems from control software to machine and another transformation is utilized when transforming coordinate systems from machine to control software.

The transformation bank 120 can store transformation algorithms (e.g., instructions) utilized by the coordinate transformation component 110. As noted above, many conventional coordinate system transforms are hard coded in C, Basic, assembly, Pascal, etc., whereas the subject invention enables a user to program coordinate system with any IEC language. This novel approach to creating user-defined coordinate systems in IEC languages provides flexibility and results in synchronization between the user-defined coordinate systems/transformations and the motion control system.

Figure 2:
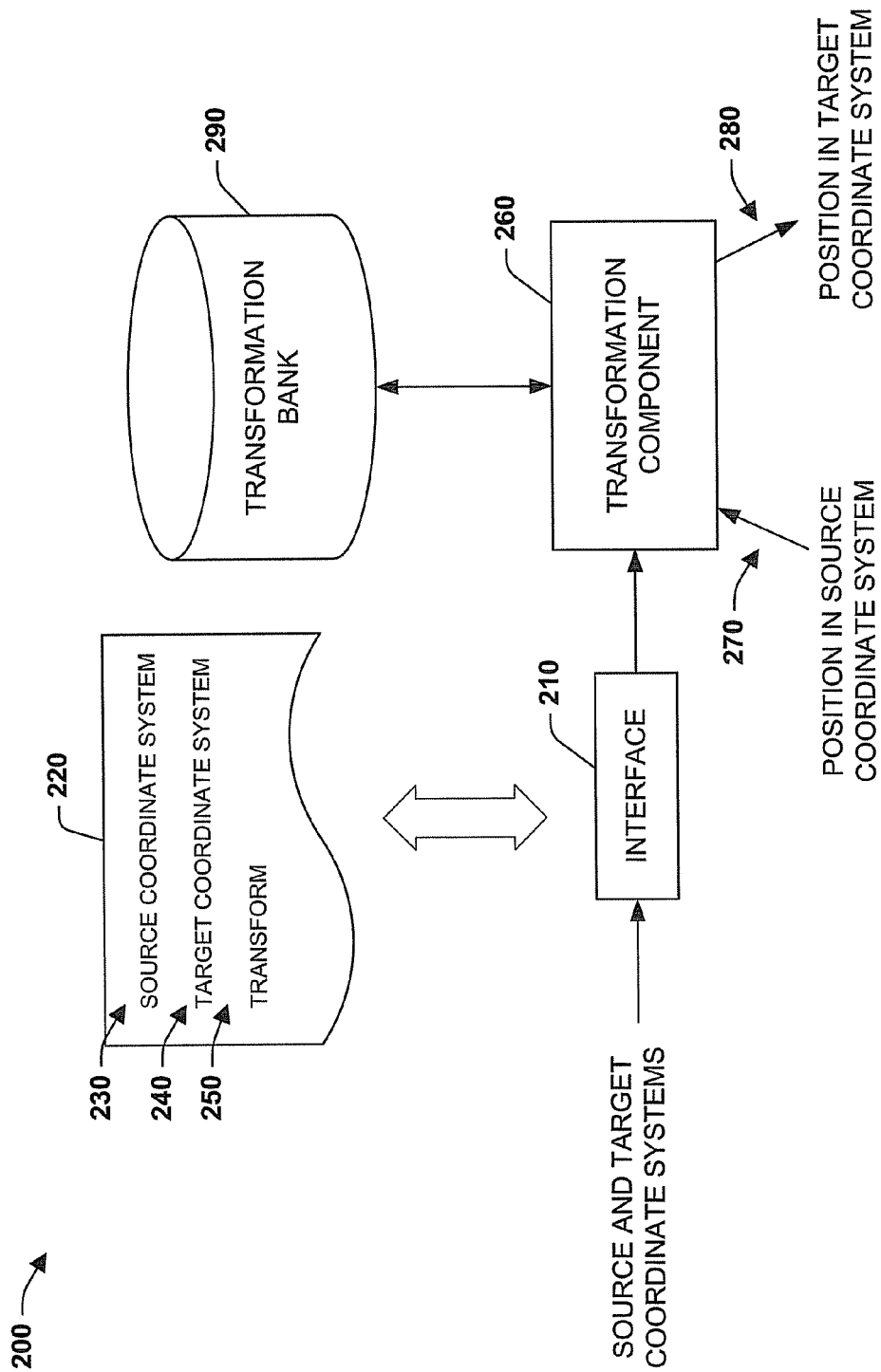
FIG. 2 illustrates a system that facilitates coordinate system transformations within industrial control environments via a motion control instruction.

FIG. 2 illustrates a system 200 that facilitates coordinate system transformations within industrial control environments via a motion control instruction that defines a source coordinate system for a source system, a target coordinate system for a target system, and a transformation between the source and target coordinate systems. In general, a source system is a system that when commanded to move or is manually moved elicits a corresponding move in a target system. The transformation specified in the instruction is employed to transform the source's position (associated with the commanded/manual move in the source coordinate system) to a target position in the target coordinate system. It is to be appreciated that a coordinate system can concurrently be a target coordinate system for a machine that moves in response to a movement of a source system and a source coordinate system for another machine.

The system 200 includes an interface 210. The interface 210 can be a human interface and/or part of an industrial control/programming environment (e.g., an application program). As such, a programmer can utilize the interface 210 to select/define source and target coordinate systems. By way of example, a programmer who desires to control motion associated with a machine can interact with the interface 210 and set the source system and target systems. Upon selection, the interface 210 can present available transformations. If a transformation for the conversion between source and target coordinate systems exists, the interface 210 can generate an instruction 220 that at least includes an entry 230 that specifies the source system's coordinate system, an entry 240 that specifies the target system's coordinate system, and an entry 250 that specifies the transformation between the source system's coordinate system and the target system's coordinate system. Other entries within the instruction 220 are described in detail below. In other aspects of the subject invention, the user can provide a transformation such as a user-defined transformation written in an industrial control language as described herein when a suitable transformation is not already available.

The coordinate transformation component 260 (e.g., the coordinate transformation component 110) can transform a first position in a first coordinate system to a second position in a second coordinate system. It is to be appreciated that the first coordinate system can be a source coordinate system and the second coordinate system can be the target coordinate system. Thus, when a first position 270 in a source coordinate system is received by the coordinate transformation component 260, a transformation to convert the first position 270 to a second position 280 in the target coordinate system can be obtained from the transformation entry 250 in the instruction 220. The transform coordination component 110 can obtain this transformation from the transformation bank 290 and convert the first position 270 to the second position 280. The source system can be control software (or a machine under control) and the target system can be a machine (or control software). Examples of source-to-target and target-to-source coordinate system transformations include transformations between Cartesian, pre-defined non-Cartesian and/or user-defined non-Cartesian coordinate systems, including between different pre-defined non-Cartesian coordinate systems and between different user-defined non-Cartesian coordinate systems, as described previously.

It is to be appreciated that the interface 210 can be a graphical user interface (GUI), a command line interface, an Application Programming Interface (API), an industrial control system environment, and the like. As such, the interface 210 can provide a region and/or means to alter and/or manipulate graphical objects (e.g., icons, structures, text boxes, etc.) in connection with end-user applications and/or user interfaces. In addition, input regions can be provided for entry of parameters, arguments, etc. that can be utilized to effectuate such entities. Moreover, one or more presentation regions can be provided to dynamically present interfaces to the user to provide a preview of any alteration, manipulation and/or change. The interface 210 can include basic text and/or graphic regions that incorporate dialogue boxes, static controls, drop-down-menus, list boxes, pop-up menus, edit controls, combo boxes, radio buttons, check boxes, push buttons, and graphic boxes, for example. In addition, utilities such as vertical and/or horizontal scroll bars that facilitate navigation and toolbar buttons to determine whether a region will be viewable, hidden, minimized, etc. can be employed.

The user can interact with at least the aforementioned regions to select and provide information via various devices such as a mouse, a roller ball, a keypad, a keyboard, a pen and/or voice activation, for example. Typically, a mechanism such as a push button or an enter key on the keyboard/keypad can be employed subsequent to entering textual and/or voice information in order to invoke a response. However, it is to be appreciated that the invention is not so limited. For example, merely highlighting a check box can elicit an action. In another example, a command line user interface can be employed to prompt (e.g., via a text message on a display and an audio tone) the user to perform an action or provide information via alpha-numeric input corresponding to an option provided in the prompt or an answer to a question posed in the prompt.

Figure 3:
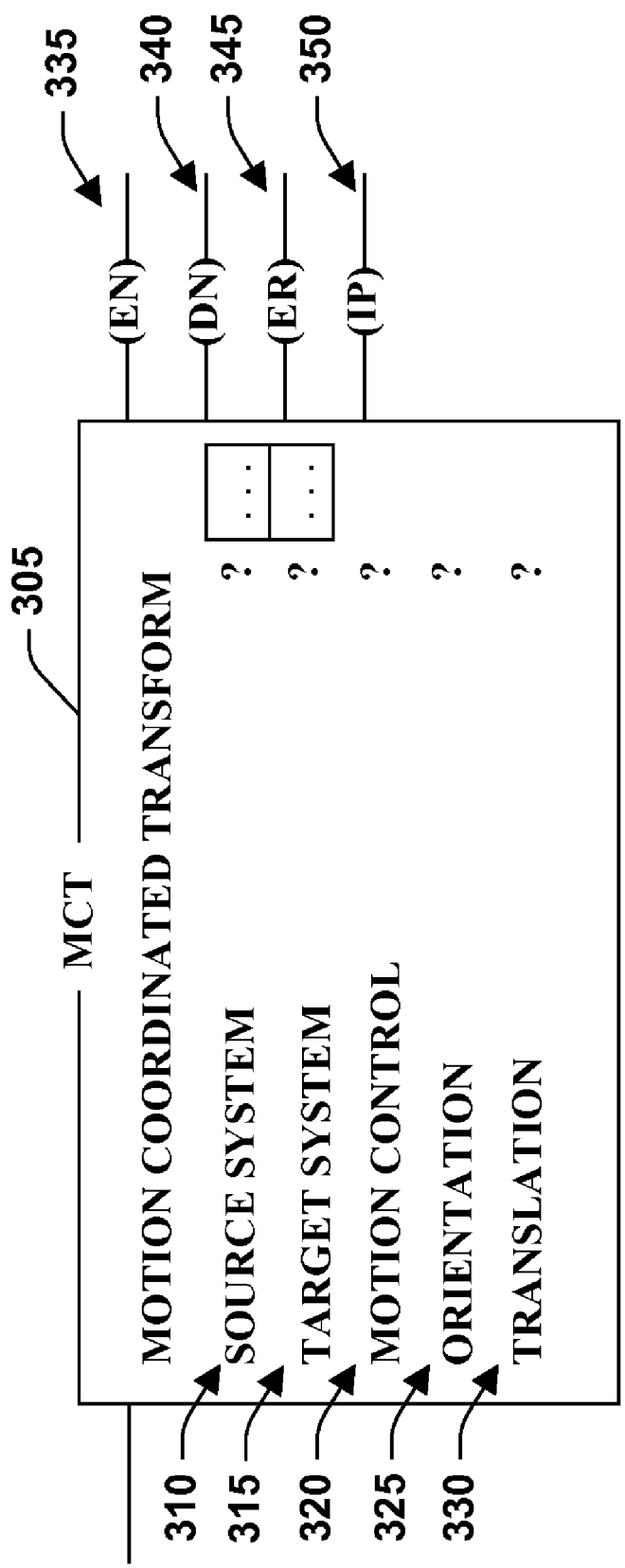
FIG. 3 illustrates an exemplary Motion Coordinated Transform (MCT) instruction.
Figure 4:
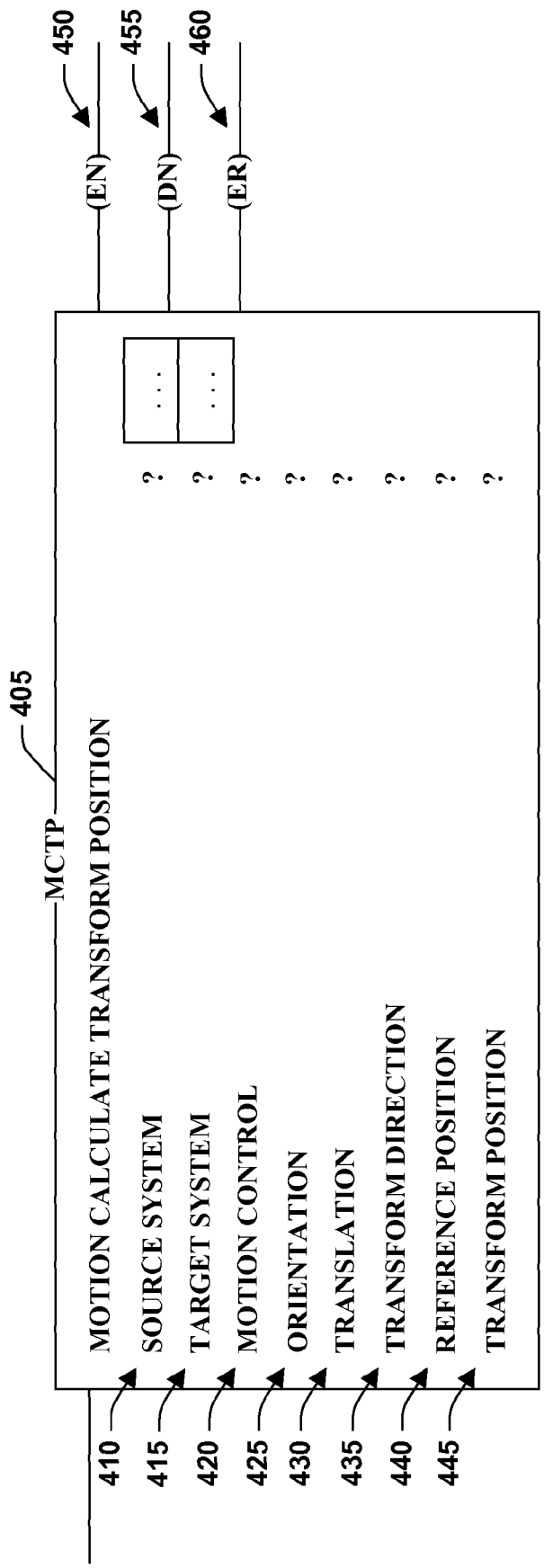
FIG. 4 illustrates an exemplary Motion Calculate Transform Position (MCTP) instruction.

FIGS. 3 and 4 illustrate exemplary instructions that can be created and/or utilized in accordance with various aspects of the subject invention. FIG. 3 depicts a Motion Coordinated Transform (MCT) instruction 305 that can initiate a continuous coordinate transformation between a specified source and target coordinate systems. In the example, the MCT instruction 305 includes the following operands: a source system operand 310; a target system operand 315; a motion control operand 320; an orientation operand 325; and a translation operand 330.

The MCT 305 instruction can be utilized to connect two different coordinate systems in order to allow a user to command motion in a source system, wherein the commanded motion (indirectly) generates motion in a target system. The source and target systems are specified in the source system operand 310 and the target system operand 315, respectively. Commonly, the source system 310 is defined in a Cartesian coordinate system and the target system 320 is defined in the machine's native (e.g., joint) space, which typically is a non-Cartesian geometry type. The transform connection can be bi-directional in that if the user chooses to move in the target system 320, motion will be generated in the source system 315.

The motion control operand 320 can be associated with various control bits, including an enable bit (EN) 335; a done bit (DN) 340; an error bit (ER) 345; and an in process bit (IP) 350. In general, EN 335 is set when the rung in which the MCT 305 instruction is programmed transitions from false to true and reset when the rung transitions from true to false; DN 340 is set when the coordinate transformation has been initiated successfully and reset when the rung transitions from false to true; ER 345 is set when the coordinate transformation has not been initiated successfully and reset when the rung transitions from false to true; and IP 350 is set when the coordinate transformation has been initiated successfully and reset when the rung transitions from false to true. In addition, the MCT instruction 305 can be associated with various error codes.

The orientation operand 325 can define a transformation vector for rotating the source coordinate system into alignment with the target coordinate system. It is to be understood that orientation is a robotic term for directional attitude or offset about a point in Cartesian (e.g., 3D) space and can be expressed as three ordered rotations commonly known as roll, pitch, and yaw measured around three axes (e.g., Z, Y and X) of a Cartesian coordinate system. The vector can be a one-dimensional array whose dimension is defined by a number of primary axes in a Cartesian representation of the source coordinate system. It is to be appreciated that this dimension can be one (e.g., [X1]), two (e.g., [X1, X2]), three (e.g., [X1, X2, X3]), . . . , N (e.g., [X1, . . . , XN]), wherein N is an integer greater to or equal than one. In one instance of the subject invention, the orientation can include three ordered rotations performed in the following sequence: Rotation around X3; Rotation around X2; and Rotation around X1. Typically, the system is configured such that all rotations must be specified in degrees according to the right-hand screw rule. However, the subject invention is not so limited.

The translation operand 330 can define a linear offset of the source coordinate system relative to the target coordinate system. It is to be understood that translation is a robotic term for a linear movement or offset in Cartesian (e.g., 3D) space and can describe a distance between two Cartesian points. Commonly, this operand is a one-dimensional array, whose dimension is defined by the number of primary axes in the Cartesian representation of the source coordinate system. For example, for a three dimensional system, the vector can be specified as X1, X2, X3, wherein these values can be in coordination units of the source coordinate system. In general, when both orientation and translation offsets are specified, control will apply the orientation offset before the translation offset.

FIG. 4 depicts a Motion Calculate Transform Position (MCTP) instruction 405 that applies a transform to a specified reference position, wherein a result of the transformation can be stored in a transform position operand. In this example, the MCTP instruction 405 includes the following operands: a source system operand 410; a target system operand 415; a motion control operand 420; an orientation operand 425; a translation operand 430; a transform direction operand 435; a reference position operand 440; and a transform position operand 445. The source system operand 410 and the target system operand 415 can define source and target axes and geometries, respectively.

The motion control operand 420 can be associated various control bits, including an enable bit (EN) 450; a done bit (DN) 455; and an error bit (ER) 460. In general, EN 450 is set when the rung in which the MCTP 405 instruction is programmed transitions from false to true and reset when the rung transitions from true to false; DN 455 is set when the coordinate transformation has been initiated successfully and reset when the rung transitions from false to true; and ER 460 is set when the coordinate transformation has not been initiated successfully and reset when the rung transitions from false to true. In addition, the MCTP instruction 405 can set one or more error codes.

The orientation operand 425 can define a transformation vector that rotates the source coordinate system into alignment with the target coordinate system. The vector can be a one-dimensional array whose dimension is defined by a number of primary axes in a Cartesian representation of the source coordinate system. It is to be appreciated that this dimension can be one (e.g., [X1]), two (e.g., [X1, X2]), three (e.g., [X1, X2, X3]), . . . , N (e.g., [X1, . . . , XN]), wherein N is an integer greater to or equal than one. In one instance of the subject invention, the orientation can include three ordered rotations performed in the following sequence: Rotation around X3; Rotation around X2; and Rotation around X1. Typically, the system is configured such that all rotations must be specified in degrees according to the right-hand screw rule. However, the subject invention is not so limited.

The translation operand 430 can define a linear offset of the source coordinate system relative to the target coordinate system. Commonly, this operand is a one-dimensional array, whose dimension is defined by the number of primary axes in the Cartesian representation of the source coordinate system. For example, for a three dimensional system, the vector can be specified as X1, X2, X3, wherein these values can be in coordination units of the source coordinate system. In general, when both orientation and translation offsets are specified, control will apply the orientation offset before the translation offset.

The transform direction operand 435 can indicate whether a forward or inverse transform is executed. In general, the forward transform takes a target position and calculates a source position and the inverse transform takes a source position and calculates a target position. The reference position operand 440 can represent the coordinates in either the source or target coordinate system, depending on the direction selected for the transform and typically is associated with a "known" position. This position can be utilized as an input to calculate the transform position. The dimension of the reference position typically matches the dimension of the coordinate system being referenced. The transform position operand 445 can also represent the coordinates in either the source or target coordinate system, depending on the direction selected for the transform. However, this transform position can represent an "unknown" position.

Figure 5:
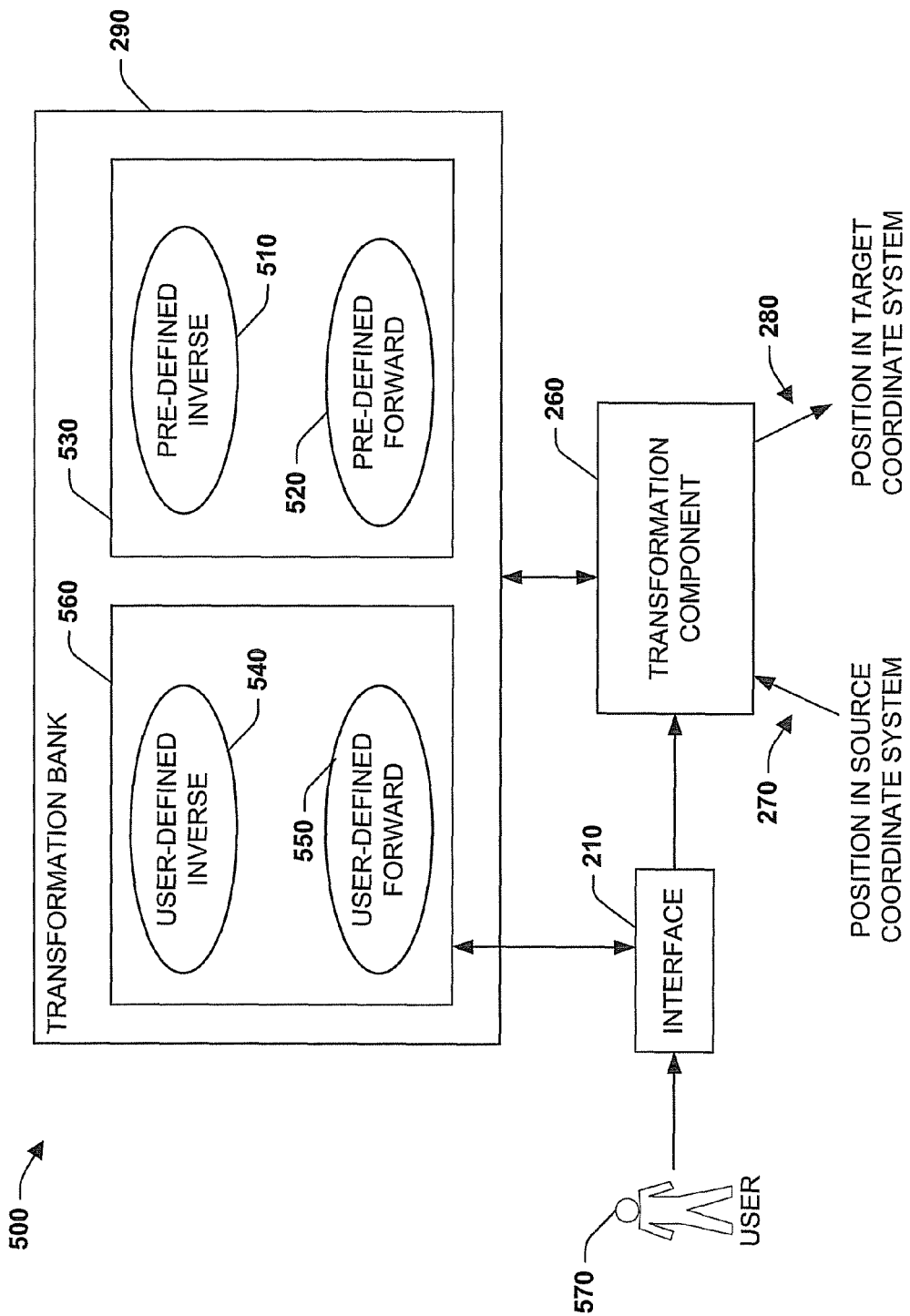
FIG. 5 illustrates an exemplary system with a transformation bank that stored inverse and forward transformations.

FIG. 5 illustrates a system 500 that includes the transformation component 260, the transformation bank 290, and the interface 210, wherein the transformation bank 290 stores various transformations, including one or more pre-defined (system) inverse 510 and one or more pre-defined (system) forward 520 transformation in a region 530 of the transformation bank 290; and one or more user-defined inverse 540 and one or more user-defined forward 550 transformations in a region 560 of the transformation bank 290.

The pre-defined inverse transforms 510 include transforms for determining a target position in Joint space given a source position in Cartesian space and the pre-defined forward transforms 520 include transforms for determining a source position in Cartesian space given a target position in Joint space. As noted previously, pre-defined transforms can be considered "system" transformations and are provided with the systems and methods described herein. Examples of transformations that can be stored in the transformation bank 290 include: Cartesian; Articulated Cylindrical; Articulated Independent (2 axes); Articulated Dependent (2 axes); Polar/Cylindrical; Articulated Independent (3 axes); Articulated Dependent (3 axes); SCARA Independent; SCARA Dependent; Spherical; SCARA Independent (4 axes); SCARA Dependent (4 axes); Articulated Independent (4 axes); and Articulated Dependent (4 axes). Graphical representations of several of the axes associated with these transformations are illustrated below in connection with FIGS. 13-18.

The user-defined inverse transforms 540 include user programmed transforms for determining a target position in Joint space given a source position in Cartesian space and the user-defined forward transforms 550 include user-programmed transforms for determining a target position in Cartesian space given a source position in Joint space. User-defined transforms are created by users and can be added, modified, and/or removed from the transformation bank 290. As depicted in the figure, a user 570 can employ the interface 210 to add, modify and/or remove user-defined transformations from the region 560 of the transformation bank 290. It is to be appreciated that various other transforms can be included in the transform bank.

Figure 6:
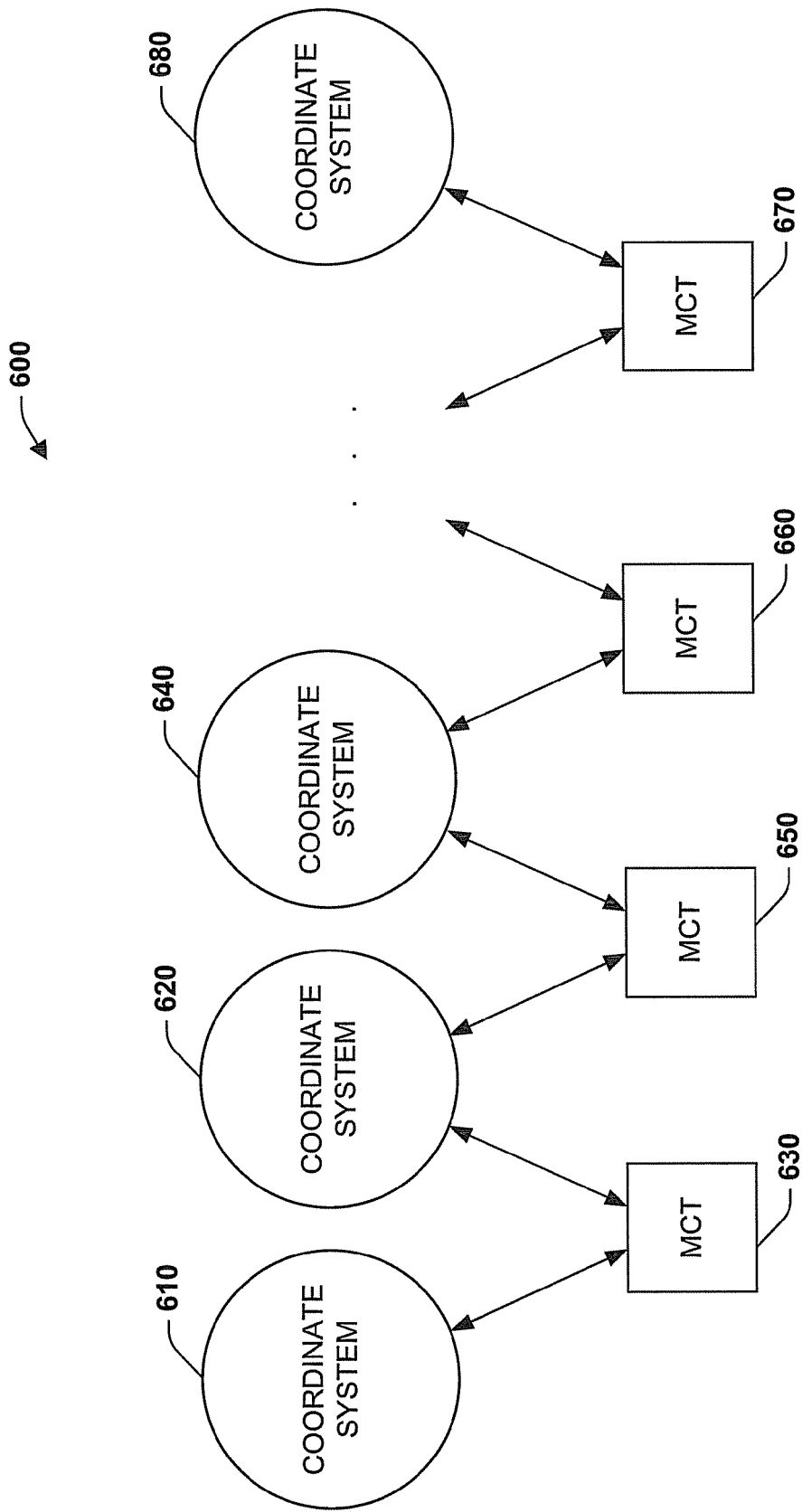
FIG. 6 illustrates an exemplary system with more than one coordinate system transformation.

FIG. 6 illustrates a system 600 with N (wherein N is an integer greater than or equal to 1) coordinate systems and N−1 coordinate system transformations. As depicted, the N coordinate systems are chained together, for example, in a daisy-chain type configuration. The system 600 includes a first source system (not shown) with a coordinate system 610. The first source system is associated with a first target system (not shown) with a coordinate system 620 via an MCT instruction 630, which transforms a position in the coordinate system 610 to a position in the coordinate system 620. The first target system with coordinate system 620 concurrently is a second source system associated with a second target system (not shown) with a coordinate system 640. This association is achieved via an MCT instruction 650, which transforms a position in the coordinate system 620 to a position in the coordinate system 640. The second target system with coordinate system 640 concurrently is a third source system connected to another target system (not shown) with another coordinate system (not shown) through an MCT instruction 660. An Nth target system (not shown) with a coordinate system 680 is connected to a source system (not shown) with a different coordinate system (not shown) through an MCT instruction 670. The foregoing example assumes motion begins with coordinate system 610. However, motion can begin at coordinate system 680 and propagate to coordinate system 610.

It is to be appreciated that respective coordinate systems 610, 620, 640 and 680 can be different coordinate systems. In additions, more than one of the coordinate systems 610, 620, 640, and 680 can be a similar coordinate system. For example, in one aspect of the subject invention the coordinate system 610 can be associated with a virtual axis that represents a programming space. Such space is typically where a user specifies a program position. Motion associated with the coordinate system 610 can be straight-lines and/or circles at intuitive speeds. The coordinate system 620 can also be associated with virtual axes and can represent positioning space. A user can utilize this space to jog/command motion to specify points, for example, for a robot in cylindrical coordinates. The coordinate system 680 can represent joint space or machine space where machine geometry is defined and motion actually occurs. Registration and (transform-off) motion to set left/right-handedness can be achieved here. Reach speeds can be entirely non-linear in this space, real servo axes can be connected, and over-travel checking can be performed. It is to be appreciated that chaining systems, as utilized herein, is defined as using the output of one system as the input of a subsequent system, wherein this concept can be replicated one or more times to extend the length of the chain.

Figure 7:
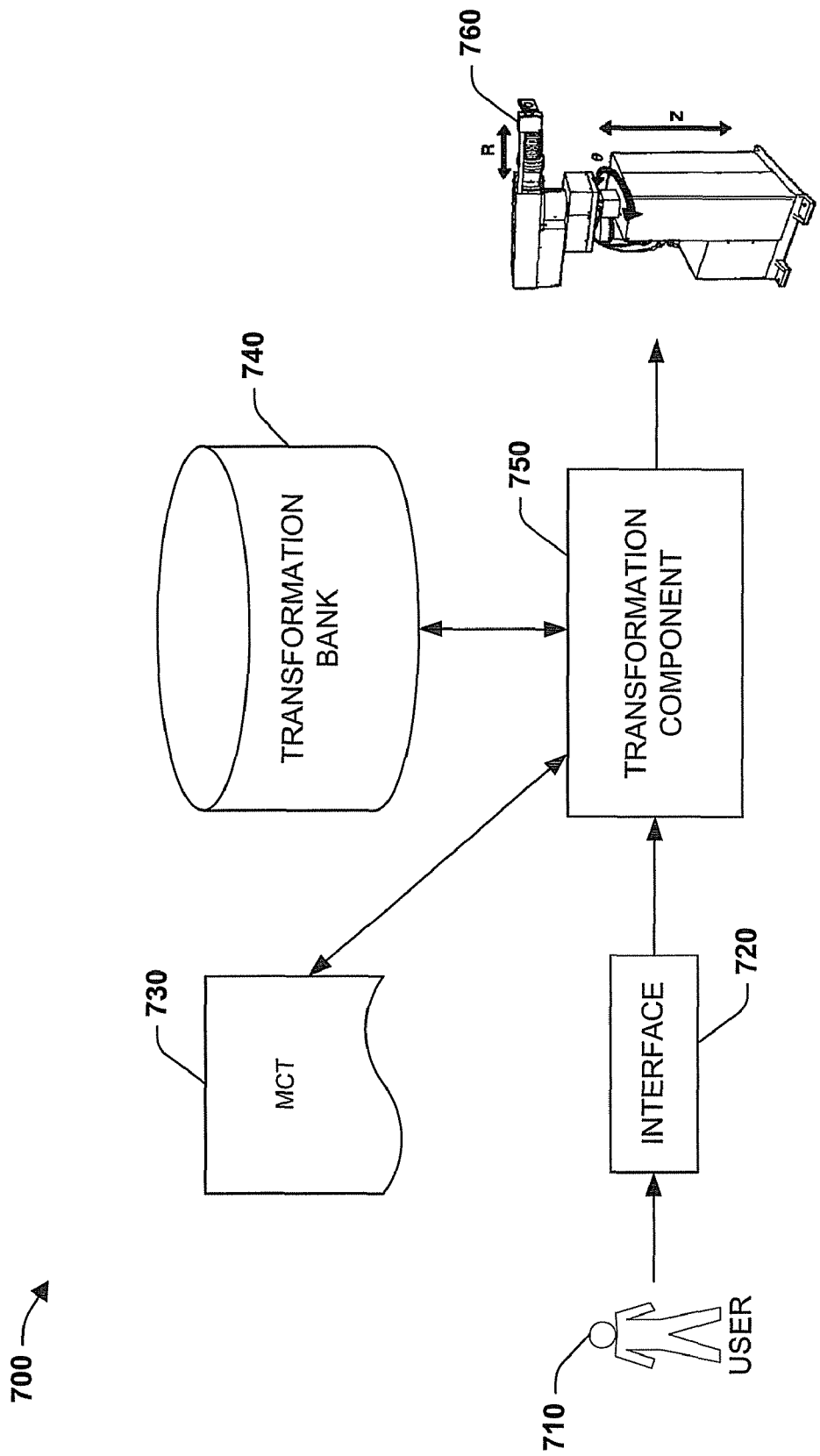
FIG. 7 illustrates an exemplary system with source control software that invokes a motion of a target machine.
Figure 8:
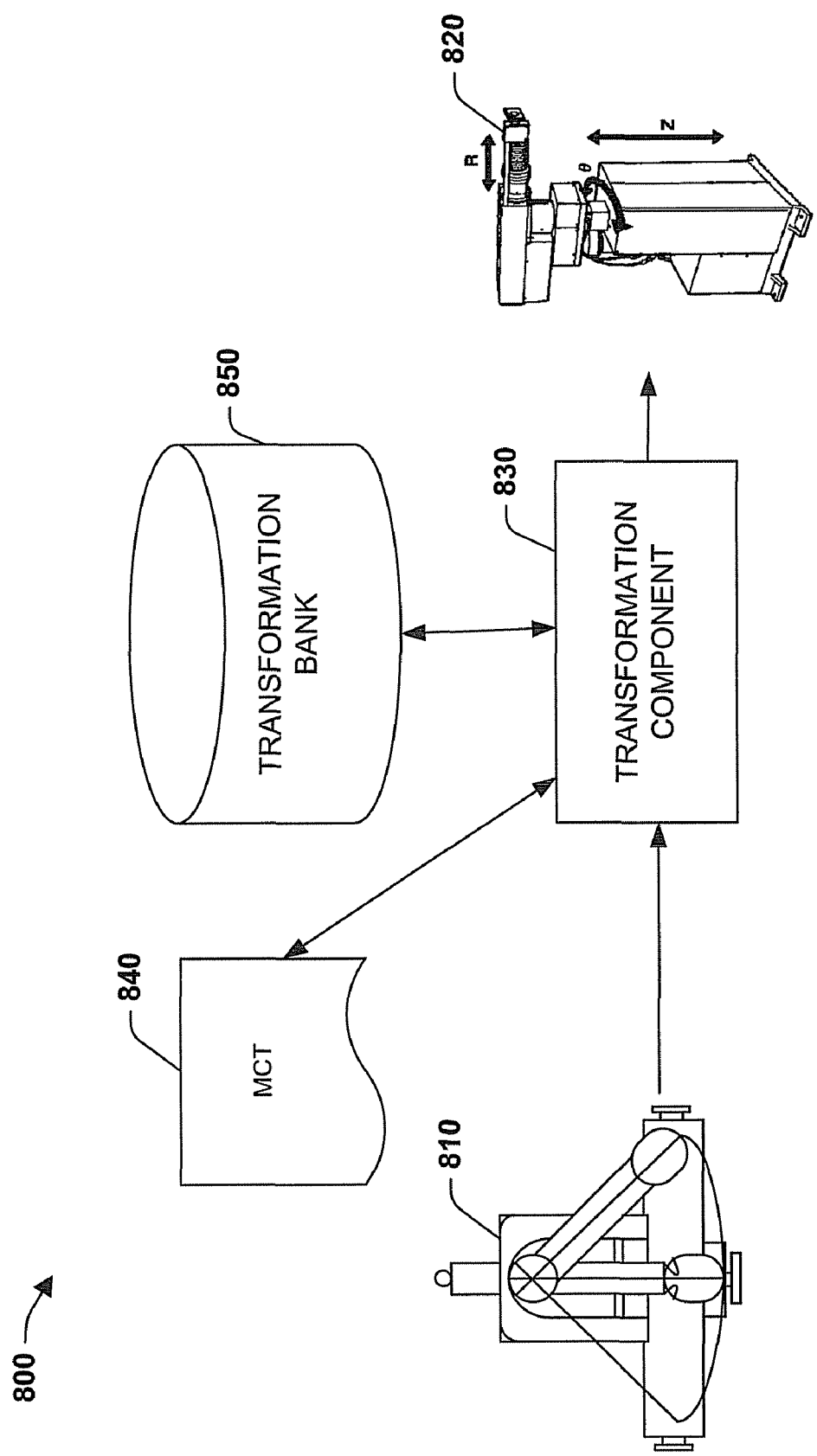
FIG. 8 illustrates an exemplary system with source machine that invokes a motion of a target machine.
Figure 9:
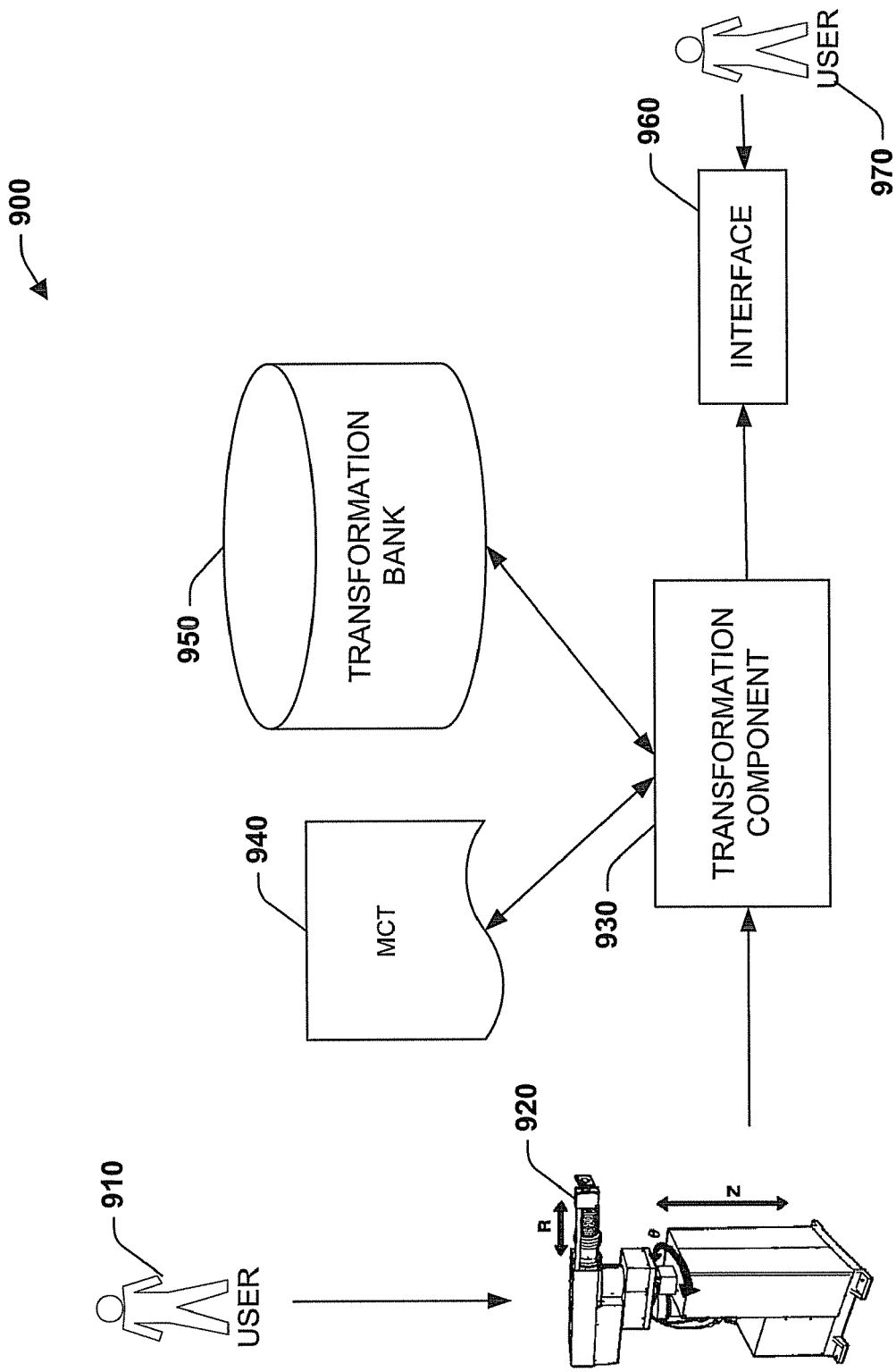
FIG. 9 illustrates an exemplary system with source machine that invokes a motion at target control software.

FIGS. 7, 8 and 9 illustrate examples of various configurations of the subject invention. FIG. 7 illustrates a system 700 that depict a user 710 commanding a move at an industrial control station (interface) 720. Upon commanding the move, an associated MCT instruction 730 is utilized to determine a suitable transform. This transform can be retrieved from a transformation bank 740 and utilized by a coordinate transformation component 750 to map the move to a position in a coordinate system of a machine 760 (e.g., a robot). The mapped motion can be utilized to move the machine 760 in accordance with the commanded move. FIG. 8 illustrates a system 800 that depict a source machine 810 and a target machine 820. When the source machine 810 moves, this movement is received and mapped by a coordinate transformation component 830 via a transform defined in an MCT instruction 840 and obtained from a transformation bank 850. The mapped movement is utilized to move the target machine 820. FIG. 9 illustrates a system 900 that depict a user 910 moving a machine 920. The motion of the machine 920 is received and mapped by a coordinate transformation component 930. The transformation can be determined from an associated MCT instruction 940 and obtained from a transformation bank 950. The mapped movement is utilized to update a control interface 960 employed by a user 970.

Figure 10:
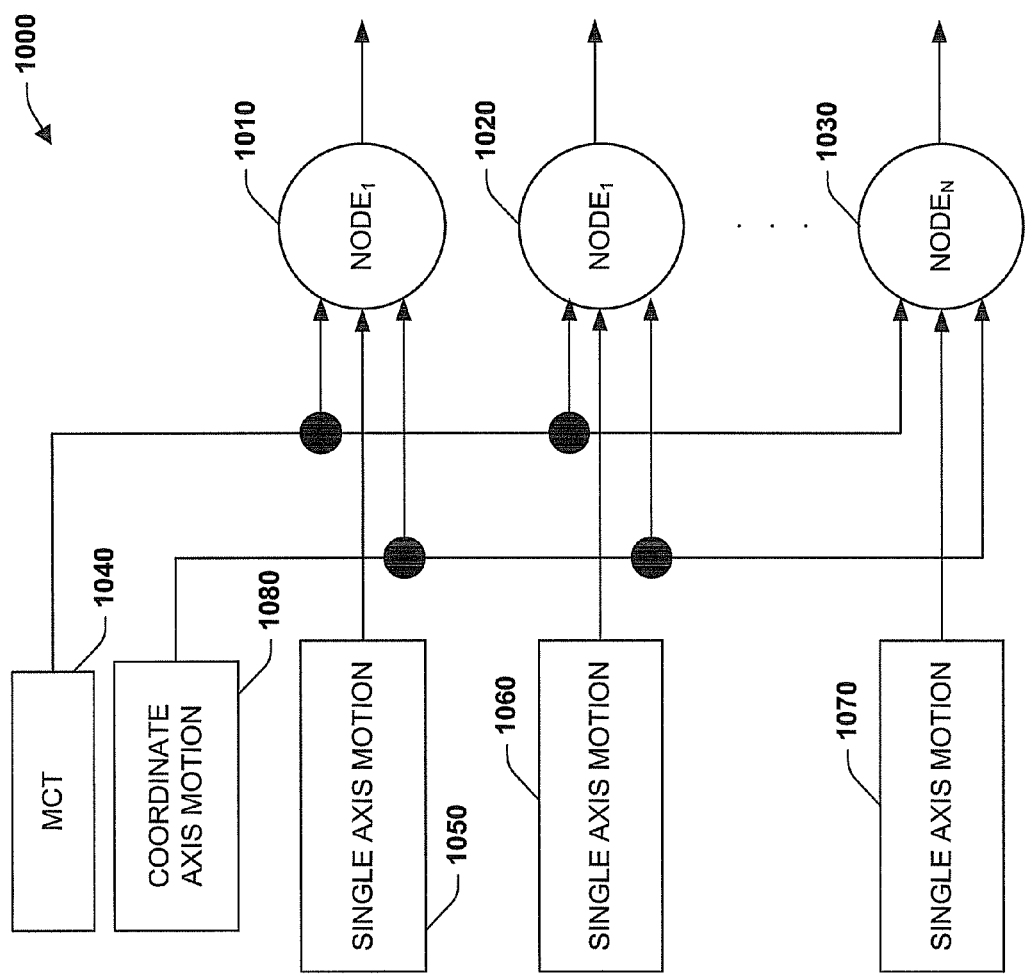
FIG. 10 illustrates an exemplary system wherein a number of axes of a source system is different from a number of axes of a target system.
Figure 11:
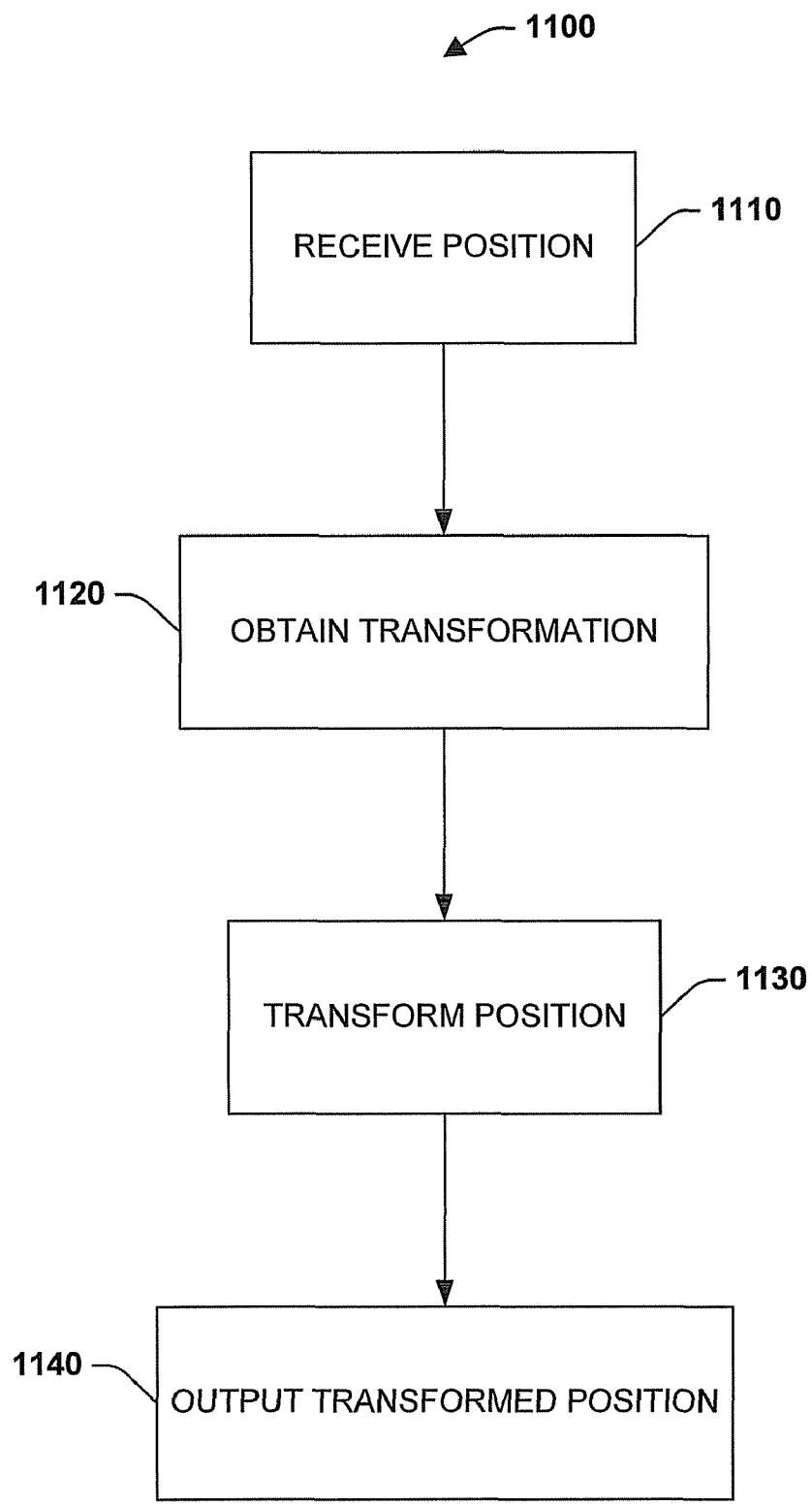
FIG. 11 illustrates an exemplary methodology that transforms a position in one coordinate system to a position in a second coordinate system.
Figure 12:
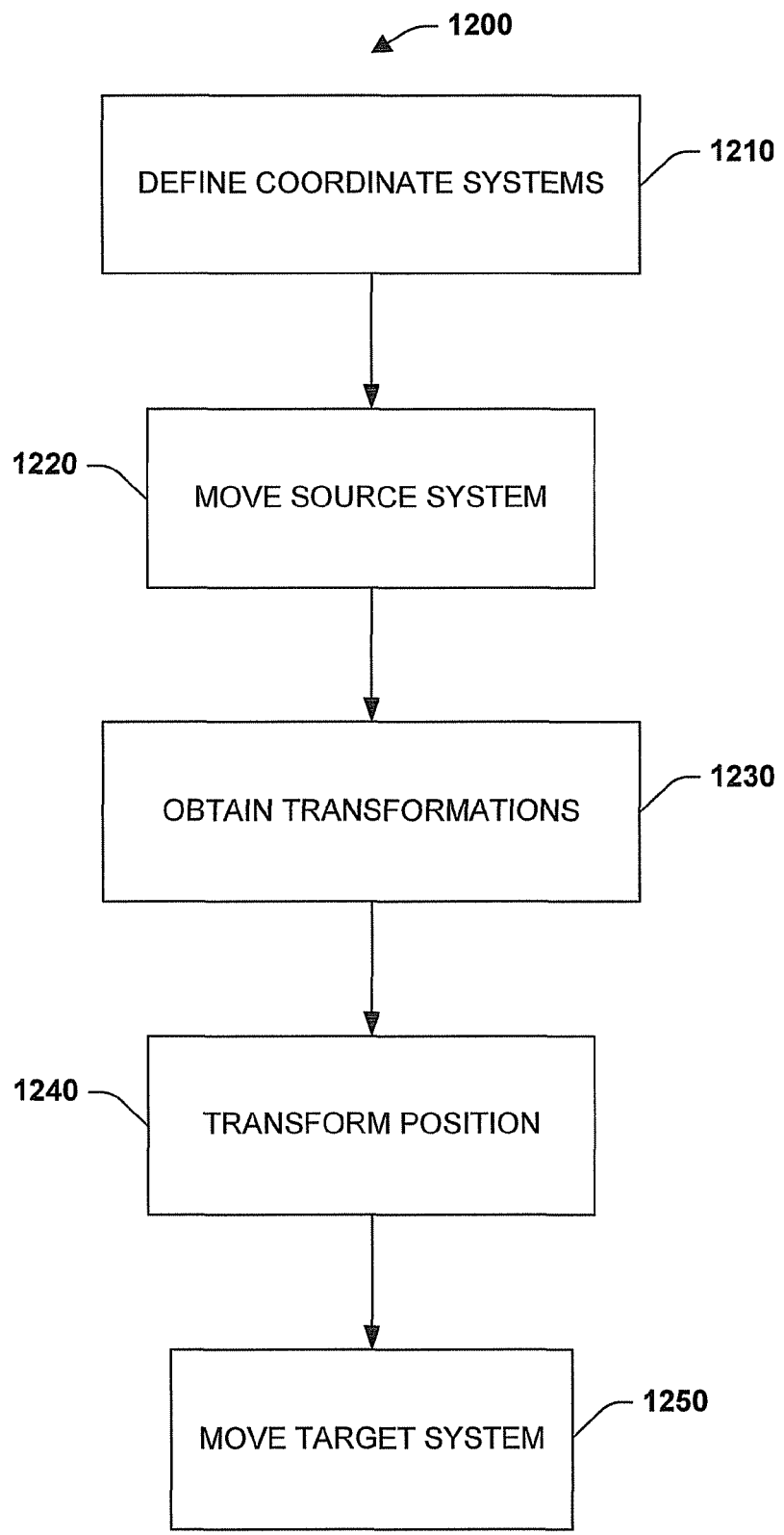
FIG. 12 illustrates an exemplary methodology that couples systems together through a motion instruction.

FIGS. 10-12 illustrate methodologies, in accordance with an aspect of the present invention. While, for purposes of simplicity of explanation, the methodologies are shown and described as a series of acts, it is to be understood and appreciated that the present invention is not limited by the order of acts, as some acts can, in accordance with the present invention, occur in different orders and/or concurrently with other acts from that shown and described herein. For example, those skilled in the art will understand and appreciate that one or more of the methodologies could alternatively be represented as a series of interrelated states or events, such as in a state diagram. Moreover, not all illustrated acts may be required to implement the methodologies in accordance with the present invention.

FIG. 10 illustrates a system 1000 with a different number of source and target axes. The system 1000 includes N axis nodes 1010, 1020 and 1030 (collectively referred to hereafter as 1010-1030), wherein N is an integer equal to or greater than one. Each axis node represents an axis of either the source or the target system. The system 1000 further includes a motion instruction (MCT) object 1040. As described previously, the MCT object 1040 specifies the source and target systems and enables a transformation between source and target coordinates systems. As depicted, the MCT object 1040 provides position information to the N axis nodes 1010-1030. In addition to the position information from the MCT 1040, any or all of the respective axis nodes 1010-1030 can receive individual axis information, for example, by single axis objects 1050, 1060, and 1070 (collectively referred to hereafter as 1050-1070). As depicted, the single axis object 1050 provides single axis information to axis node 1010, the single axis object 1060 provides single axis information to axis node 1020, and the single axis object 1070 provides single axis information to axis node 1030. Furthermore, the axis nodes 1010-1030 can receive position information from coordinated axis object 1080. It is to be appreciated that the coordinated axis object 1080 can be referred to as a coordinated axis motion node. The information provided by the MCT object 1040, respective individual axis objects 1050-1070, and coordinated axis object 1080 can be summed at respective axis nodes 1010-1030, wherein the summation can be utilized to move respective axes of the source (or target) system when the target (or source) system moves. It is to be appreciated that the foregoing example is illustrative and not limitative.

In general, the number of source and target coordinate system axes does not have to match. When there are more axes in the coordinate system than the transformation equations require, then only the required axes are utilized and axes not required can be ignored. In addition, the order of execution of the nodes can be specified, for example, in a node sequence list, wherein all nodes generating an input to a node are executed prior to the execution of that node. Typically, the node sequence list is recorded and/or stored when the MCT object 1040 connection is made. Recording such information ensures this sequencing is enforced. In addition, the sequencing does not change as forward and inverse transforms are invoked, for example, when the direction of motion changes and, thus, the sequence list will not be re-ordered. It is to be appreciated that during an error state, movement by the target system can be transformed and utilized to update the source system.

FIG. 11 illustrates a methodology 1100 that transforms a position in one coordinate system to a position in a second coordinate system in an industrial control environment. At reference numeral 1110, a first position in a first coordinate system is received. This position can be associated with a commanded move or a manual move. An example of a commanded move is where a user employs control software to move machine, and an example of a manual move is where the user physically moves the machine without the control software. In many instances, the commanded move is input in a Cartesian coordinate system. For example, the user can enter a new/next position as an x-axis, a y-axis, a z-axis, a pitch, a yaw, and a roll coordinate. However, the invention is not so limited and the user can enter the new/next position in essentially any coordinate system, including user-defined coordinate systems. Manual moves can occur in the native coordinate system of the machine that is moved. The native coordinate system can be a Cartesian coordinates system; however, machine coordinate systems typically are pre-defined or user-defined non-Cartesian coordinate systems, as described herein.

At reference numeral 1120, a suitable transform for the conversion of the first position to a second position in a second coordinate system is obtained. As noted above, a commanded move invoked with control software commonly is provided as a position in a Cartesian coordinate system, whereas the machine's coordinate system commonly is a non-Cartesian native coordinate system. Thus, when control software controls a machine's movement, two different coordinate systems may have to operate together to achieve a commanded move. In many instances, the transformation between any two coordinate systems can be defined in a motion instruction, which can be set up by a user. In addition, the transformation can be from Cartesian to Cartesian coordinate systems, from Cartesian to non-Cartesian (pre-defined and user-defined) coordinate systems, non-Cartesian (pre-defined and user-defined) to Cartesian coordinate systems, and from one non-Cartesian coordinate system (pre-defined and user-defined) to a different non-Cartesian coordinate system (pre-defined and user-defined).

At 1130, the transformation is utilized to convert the first position in the first coordinate system to the second position in the second coordinate system. In one aspect of the subject invention, the transform obtained converts the position in the Cartesian coordinate system to the position in the non-Cartesian coordinate system. Similarly, when the machine is manually moved, the transform converts the position in non-Cartesian coordinate system to the position in the Cartesian coordinate system. With many systems, both a commanded move and a manual move can occur and, thus, two different transforms (e.g., a forward and an inverse) are utilized, one that converts Cartesian coordinates to non-Cartesian coordinates and one that converts non-Cartesian coordinates to Cartesian coordinates. Moreover, multiple position transformations can occur when transforming a commanded move to a machine's move and vice versa. For example, a commanded move in Cartesian coordinates can be converted to non-Cartesian coordinates for an intermediary device, wherein the non-Cartesian coordinates can be converted to different non-Cartesian coordinates and utilized to move the machine. At 1140, the converted position is output and utilized to move the machine and/or update control software.

FIG. 12 illustrates a methodology 1200 that couples systems together through a motion instruction. At 1210, coordinate systems of two or more systems are connected together by generating a motion instruction. For example, a user can employ control software and designate a source system and a target system, wherein an instruction can be automatically generated and, additionally, include at least a transformation from the coordinate system of the source to the coordinate system of the target. Where multiple coordinate transformations occur, the user can create separate motion instructions for each transformation. It is to be appreciated that a system can concurrently be a target system that moves when a source system moves and a source system whose movement elicits a movement in a target system. It is also to be appreciated that each motion instruction can specify a transformation that converts a position from a Cartesian coordinate system to a non-Cartesian coordinate system (e.g., pre-defined or user-defined), a non-Cartesian (e.g., pre-defined or user-defined) coordinate system to a Cartesian coordinate system, and a non-Cartesian (e.g., pre-defined or user-defined) coordinate system to a different non-Cartesian (e.g., pre-defined or user-defined) coordinate system.

At reference numeral 1220, a source system moves. Such move can be a commanded move via control software or a source system, or a manual move, for example, a physical move by a user. At 1230, an associated motion instruction is utilized to obtain a suitable transformation between the position of the source system and a position of the target system. Such transformations can be stored in transformation bank and can include various transformations between coordinate system (e.g., Cartesian and pre-defined and/or user-defined) non-Cartesian coordinate systems). At reference numeral 1240, the transformation is utilized to transform the source position to a target position, and at 1250 the target position can be utilized move the target system. Where one or more target systems are also source systems, the forgoing can be repeated as necessary such that the move by the initial source system is propagated throughout the remaining systems.

Figure 13:
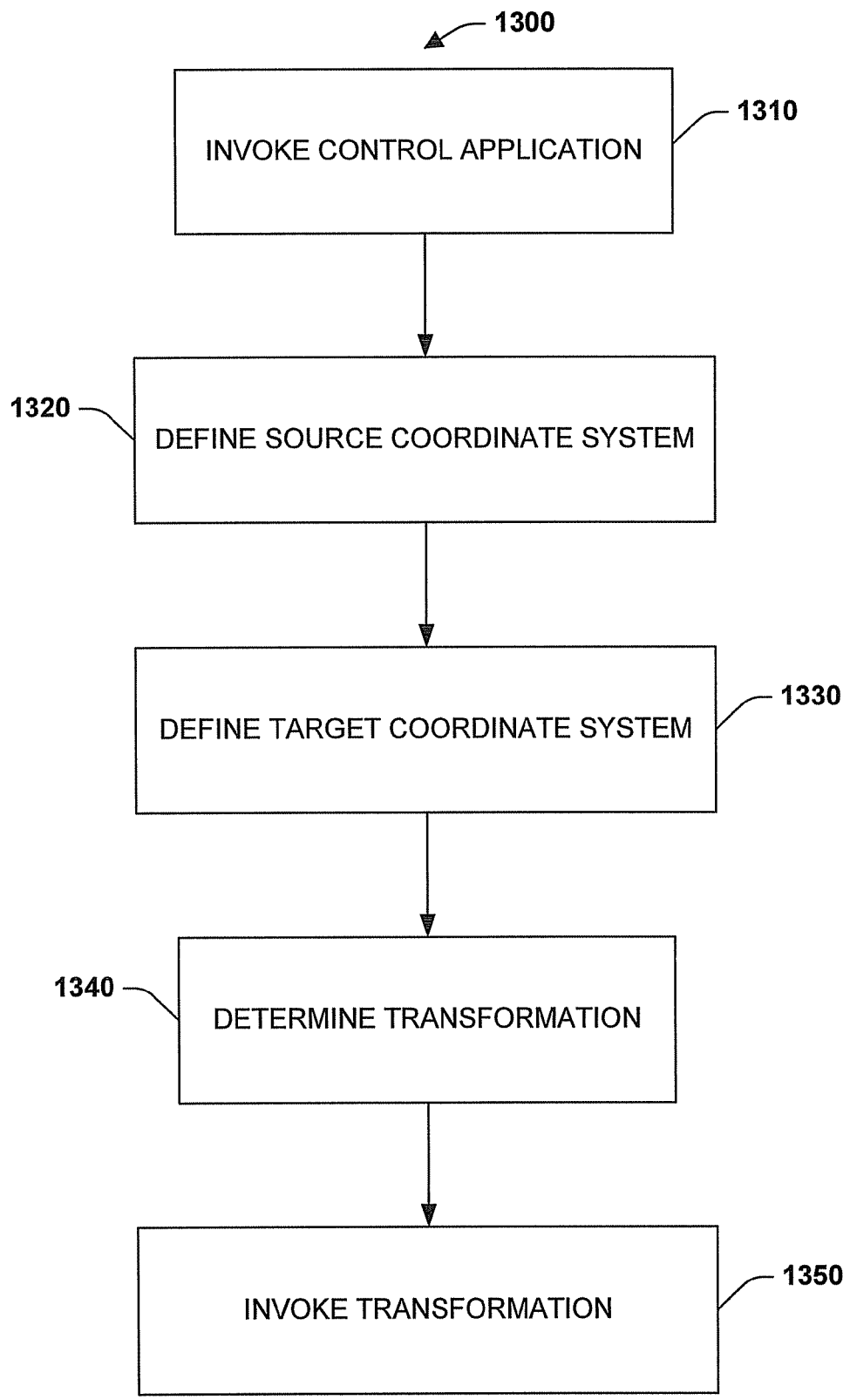
FIG. 13 illustrates an exemplary methodology for creating a motion instruction that can be utilized to facilitate motion control in an industrial control environment.

FIG. 13 illustrates a methodology 1300 for creating a motion instruction that can be utilized to facilitate motion control in an industrial control environment. At 1310, a user can invoke an industrial control application. The application can include various tools and utilities for setting up control of a machine. At 1320, the user enters a source coordinate system. The source coordinate system can be Cartesian or non-Cartesian (pre-defined or user-defined). At reference numeral 1330, the user enters a target coordinate system. Likewise, the target coordinate system can be Cartesian or non-Cartesian (pre-defined or user-defined). At 1340, a transformation between the source and target coordinate systems is determined. At 1350, the source and target coordinate systems and the transformation is utilized to create a motion instruction. It is to be appreciated that the instruction can be a Motion Coordinated Transform (MCT) instruction or Motion Calculate Transform Position (MCTP) instruction, as described in detail above.

Figure 14:
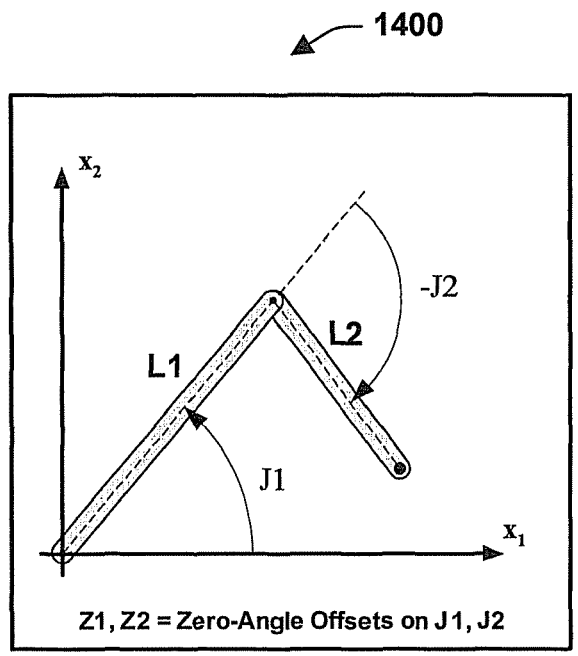
FIGS. 14-19 illustrate exemplary coordinate systems that can be utilized in accordance with various aspects of the subject invention.
Figure 15:
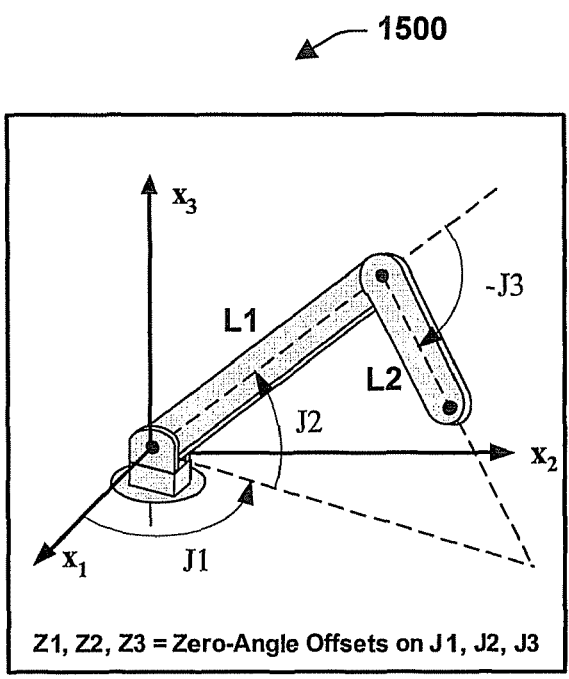
Figure 16:
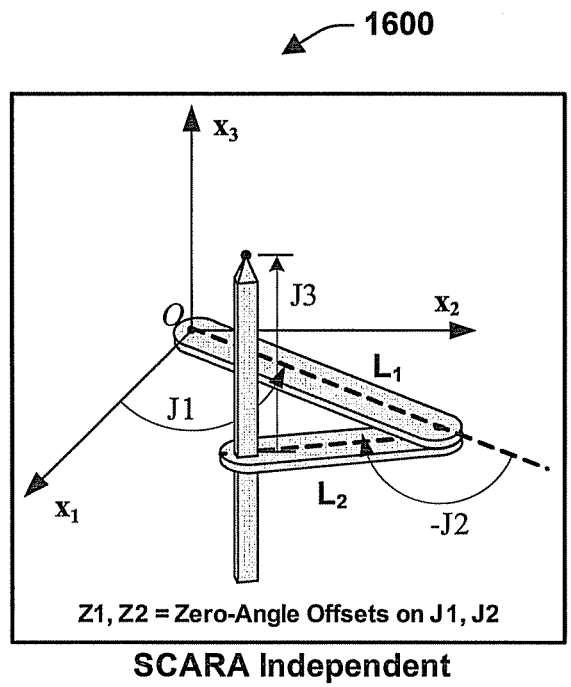
Figure 17:
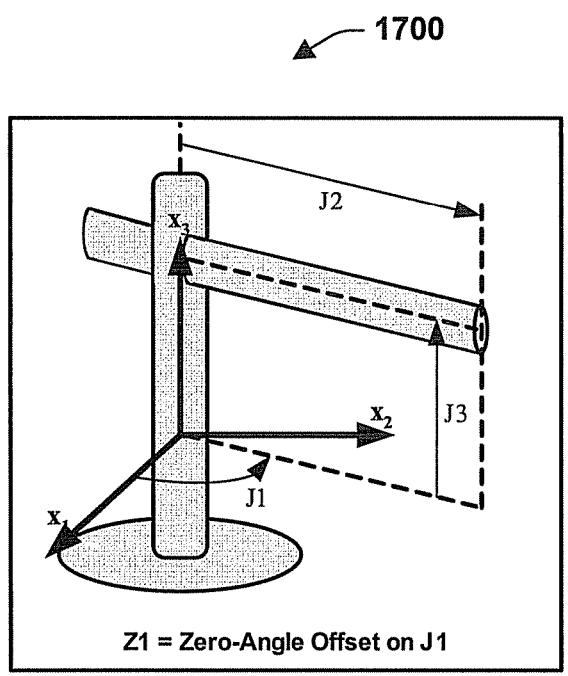
Figure 18:
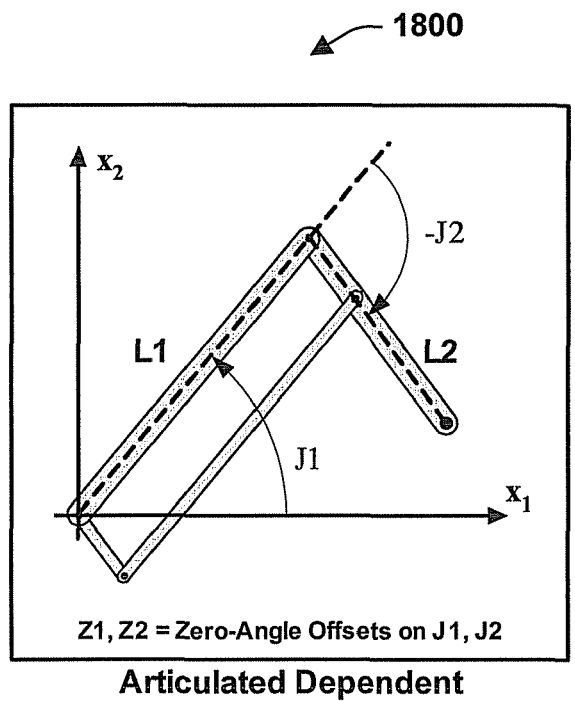
Figure 19:
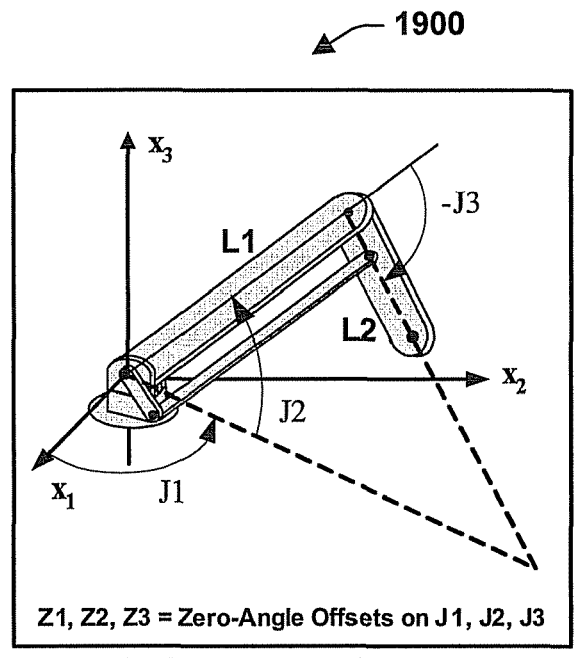

FIGS. 14-19 illustrate exemplary coordinate systems that can be employed in accordance with aspects of the subject invention. It is to be appreciated that these examples are illustrative and do not limit the invention. Essentially, any coordinate system can be employed. FIG. 14 shows an articulated independent coordinate system 1400, and FIG. 15 shows a vertical articulate independent coordinate system 1500. FIG. 16 shows a SCARA independent coordinate system 1600, and FIG. 17 shows a polar/cylindrical coordinate system 1700. FIG. 18 shows an articulated dependent coordinate system 1800, and FIG. 19 shows a vertical articulate dependent coordinate system 1900.

What has been described above includes examples of the present invention. It is, of course, not possible to describe every conceivable combination of components or methodologies for purposes of describing the present invention, but one of ordinary skill in the art may recognize that many further combinations and permutations of the present invention are possible. Accordingly, the present invention is intended to embrace all such alterations, modifications, and variations that fall within the spirit and scope of the appended claims. In particular and in regard to the various functions performed by the above described components, devices, circuits, systems and the like, the terms (including a reference to a "means") used to describe such components are intended to correspond, unless otherwise indicated, to any component which performs the specified function of the described component (e.g., a functional equivalent), even though not structurally equivalent to the disclosed structure, which performs the function in the herein illustrated exemplary aspects of the invention. In this regard, it will also be recognized that the invention includes a system as well as a computer-readable medium having computer-executable instructions for performing the acts and/or events of the various methods of the invention. In addition, while a particular feature of the invention may have been disclosed with respect to only one of several implementations, such feature may be combined with one or more other features of the other implementations as may be desired and advantageous for any given or particular application.

What is claimed is:

1. A system that facilitates motion control in an industrial control environment, comprising:
   a transformation component that transforms a position from a first coordinate system to a second coordinate system of disparate type, the position relates to effectuating a motion of an industrial control device, the transformation component transforms the position into the second coordinate system by employing a user-defined transform written in an industrial control language; and
   an industrial controller that controls the industrial control device based on the transformed position.

2. The system of claim 1, the motion effectuated by the position of the first coordinate system is transformed to a movement in the second coordinate system, control of the industrial device is facilitated by utilizing the movement.

3. The system of claim 1, further comprising an interface component that receives the first coordinate system position.

4. The system of claim 3, wherein the interface component receives the first coordinate system position from control software or a graphical user interface.

5. The system of claim 1, wherein at least one of the first or the second coordinate systems are a Cartesian coordinate system, a pre-defined non-Cartesian coordinate system, or a user-defined non-Cartesian coordinate system.

6. The system of claim 1, further comprises a user interface that allows a user to at least one of add, modify, or remove a transform in a transformation bank.

7. The system of claim 6, wherein the transformation bank comprises a plurality of transforms available for use by the transformation component.

8. The system of claim 1, wherein the user-defined transform is employed by a motion control instruction.

9. The system of claim 8, wherein the motion control instruction is a Motion Coordinated Transform (MCT) instruction or a Motion Calculate Transform Position (MCTP) instruction.

10. A method that facilitates motion control in an industrial control environment, comprising:
    one or more processes executing on a processor to implement the following acts:
    receiving a position coordinate from a source system;
    transforming the position coordinate to a target system of disparate type than the source system; wherein the position is transformed into the target system by employing a user-defined transformation written in an industrial control language; and
    generating a movement instruction in the industrial control language based on the transformed position coordinate.

11. The method of claim 10, further comprising effectuating motion of an industrial device based on the movement instruction.

12. The method of claim 10, wherein the source system is motion control software or a graphical user interface.

13. The method of claim 10, providing a user interface that allows a user to at least one of add, modify, or remove a transform in a transformation bank.

14. The method of claim 13, wherein the transformation bank comprises a plurality of transforms available for utilization in the transforming.

15. The method of claim 10, wherein at least one of the position coordinate of the target system or the position coordinate of the source system correspond to a Cartesian coordinate system, a pre-defined non-Cartesian coordinate system; or a user-defined non-Cartesian coordinate system.

16. The method of claim 10, wherein the position coordinate of the target system and the position coordinate of the source system are defined in a joint space.

17. The method of claim 10, wherein the movement instruction is a Motion Coordinated Transform (MCT) instruction or a Motion Calculate Transform Position (MCTP) instruction.

18. The system of claim 10, further comprising a transform that defines transformation of a position from the second coordinate system to the first coordinate system.

19. A system that facilitates motion control in an industrial control environment, comprising:

means for transforming a position from a first coordinate system to a second coordinate system based on a user-defined transformation; wherein the user defined transformation is written in an industrial control language; and means for moving an industrial device based at least in part on the transformed position.

20. The system of claim 19, wherein the position transformed from the first coordinate system to the second coordinate system is based on a movement in the first coordinate system.

* * * * *